July 15, 1952 D. O. JONES 2,603,530
VISOR USING MAGNETIC MEANS FOR ATTACHMENT
Filed Dec. 5, 1949
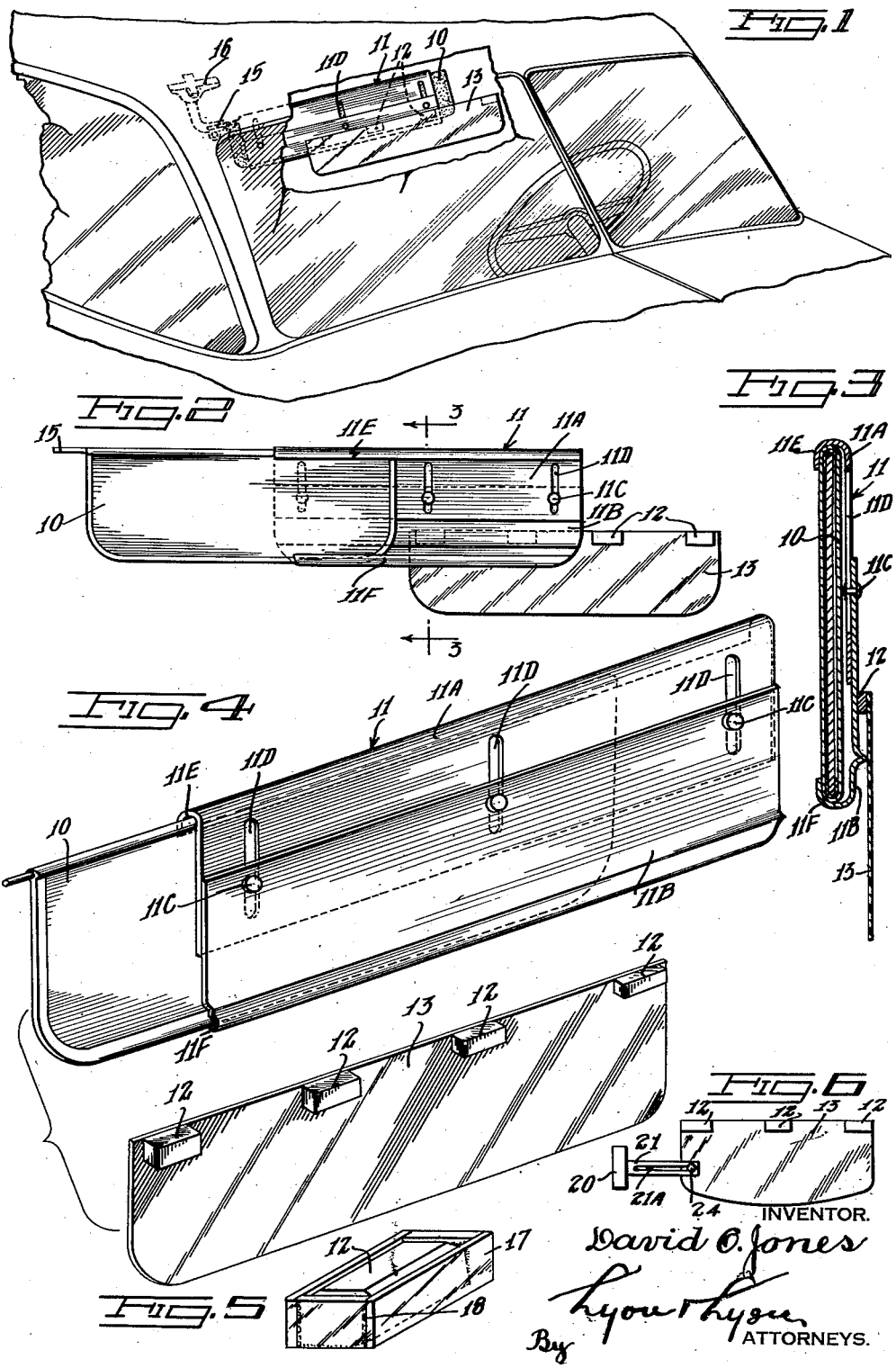
INVENTOR.
David O. Jones
By Lyon & Lyon
ATTORNEYS.

Patented July 15, 1952

2,603,530

UNITED STATES PATENT OFFICE 2,603,530

VISOR USING MAGNETIC MEANS FOR ATTACHMENT

David O. Jones, Pasadena, Calif., assignor of one-half to David K. Jones, Alhambra, Calif.

Application December 5, 1949, Serial No. 131,146

1 Claim. (Cl. 296—97)

The present invention relates to an improved visor arrangement for use in automobiles.

An object of the present invention is to provide an improved visor, characterized by the fact that it may be mounted in a multiplicity of desired positions in a simple, quick and expeditious manner.

Another object of the present invention is to provide an improved sun visor arrangement incorporating magnets adapted for use with existing conventional visors in present day automobiles.

Another object of the present invention is to provide an improved visor arrangement which may be made inexpensively in accordance with present day mass production methods and processes, and which may be easily installed in existing automobiles having visors of non-magnetic material.

The features of the present invention which are believed to be novel are set forth with particularity in the appended claim. This invention itself, both as to its organization and manner of operation, together with further objects and advantages thereof, may be best understood by reference to the following description taken in connection with the accompanying drawings in which:

Figure 1 is a perspective view showing my visor arrangement mounted in an automobile, Figure 2 is a view in side elevation of the installation shown in Figure 1, Figure 3 is a sectional view taken substantially on the line 3—3 of Figure 2, Figure 4 is a perspective view showing the back side of the arrangement shown in Figure 2, with the visor having magnetic means thereon in detached position, Figure 5 is a perspective view showing the manner in which the individual magnets 12 are affixed to the seal 13, and Figure 6 shows a modified glare shield embodying features of the present invention.

In accordance with the present invention, there is provided, for mounting on the conventional sun visor 10 of an automobile, an adjustable magnetizable plate 11 for magnetic cooperation with small Alnico magnets 12 affixed along an edge of a transparent glare shield 13. The magnetizable plate 11 is adjustable in size and comprises, in fact, two relatively movable members 11A and 11B which are frictionally held in adjusted position by the friction bolts 11C passing through a slightly oversize aperture in the member 11B and through elongated adjustment slots 11D in the other member 11A. The friction bolts may be conventional bolts and nut assemblies or lifts of appropriate size with friction washers or surfaces bearing against the movable members 11A and 11B to provide the desired degree of friction.

It is noted that the extreme outside edges of the members 11A, 11B are parallel and curved inwardly to form lips 11E, 11F, adapted to overlie and engage the edges of the conventional visor 10 normally found in present day automobiles.

As is conventionally practiced, the visor 10, as shown in Figure 1, may be mounted for pivoting about the axis of the pin 15 to adjust the visor 10 in a vertical plane, and also incorporates conventional means 16 to allow the complete visor to be swung from a position in front of the windshield of the automobile to a position adjacent the front side window of the automobile. The particular mounting structure whereby the visor 10 may be adjusted either in front of the windshield or in front of the front side window, as is well known, may all be conventional and such means per se forms no part of the present invention.

It is noted that the magnetizable plate having the general reference numeral 11 is adjustable for different size sun visors 10, so that it may be universally applicable. In mounting the plate 11 of magnetizable material, the members 11A, 11B are first pulled outwardly one from the other to an extreme position wherein the edges 11E, 11F are at maximum separation. The plate 11 is then placed adjacent the shield 10 and the members 11A, 11B are pressed towards one another with sufficient force to overcome the forces exerted by the friction bolts 11C. These members 11A, 11B are moved in sufficiently to cause the lips 11E, 11F to overlap the edges of the visor 10 and to contact the same, whereby the plate 11 is firmly secured to the visor 10. The plate 11 is maintained in this adjusted position by the frictional forces developed by the friction bolts 11C, which also serve at all times to maintain the two parts 11A, 11B, together in use and while in storage.

The plate 11 of magnetizable material is thus in position for cooperation with the "Alnico" magnets 12 affixed to the top edge of the glare shield 13. It is observed that a glare shield 13 may be mounted in a multiplicity of positions with respect to the shield 10 and magnetizable plate 11 and may, in fact, extend beyond the confines of such members, as shown in Figure 2, thereby allowing extended coverage.

Preferably, the magnets 12 are mounted on the transparent shield 13 in the manner indicated in Figure 5. In Figure 5 the magnet 12 is first cemented within a plastic case 17, which is about 1/32 of an inch oversize, a mixture of the same type of plastic material and cement being disposed between the case 17 and magnet 12, as indicated at 18. This case 17 of clear extruded plastic is then, in turn, cemented to the transparent sheet 13 which also may be of plastic material of different colors, preferably of a so-called smoky green color. In the finished assembly the magnet 12 extends approximately 1/16 or 1/8 of an inch higher than the plastic case 17.

In the modified structure shown in Figure 6, the sheet 13 is provided with an auxiliary Alnico magnet 20 mounted on the free end of a bar 21 adjustably positioned on the sheet 13 by means of the adjusting bolt 24 which passes through a slightly oversize apertured portion in the sheet 13, and through an elongated adjustment slot 21A in the bar 21. It is noted that this auxiliary magnet 20 may thus be moved longitudinally as well as swung in an arc to position it in optimum relationship to surrounding steel portions of the associated automobile, especially when the visor is being used to shield against the sun rays coming through the front side window.

While I prefer to provide a magnetizable plate of the type shown as 11 herein, the present invention, in its broader aspects, may be practiced by enclosing or embedding a magnetizable sheet or plate within the visor 10 itself. In such case, it may be desirable to place flocking material over the magnetizable plate or to cover the same with fabric, cardboard or the like.

Also, while the transparent sheet 13 with the magnets 12 thereon is adapted especially for use with the magnetizable plate 11, it may be used apart from such magnetizable plate 11 in those instances where the steel of the automobile may accomplish the purpose intended to be accomplished by such magnetizable plate 11. This is particularly true when the shield 13 is used for shielding against rays entering the windows of the back doors as well as the rear window.

While the particular embodiments of the present invention have been shown and described, it will be obvious to those skilled in the art that changes and modifications may be made without departing from this invention in its broader aspects and, therefore, the aim in the appended claim is to cover all such changes and modifications as fall within the true spirit and scope of this invention.

I claim:

In a visor of the character described, a pair of plate members of magnetizable material, friction bolts passing through a slightly oversize aperture in one of said plate members and through an elongated adjustment slot in the other one of said plate members to maintain said plate members in adjusted position, each of said plate members having an outer edge bent inwardly to form a lip adapted to partially encircle and to engage the parallel edges of a conventional visor, and a transparent sheet with magnets spaced along one of its edges, said magnets cooperating with said magnetizable plate members to maintain said transparent sheet in adjusted position.

DAVID O. JONES.

REFERENCES CITED

The following references are of record in the file of this patent:

UNITED STATES PATENTS

| Number | Name | Date |
|---|---|---|
| 1,069,000 | Giles | July 29, 1913 |
| 1,483,640 | Manning | Feb. 12, 1924 |
| 1,735,883 | Smith | Nov. 19, 1929 |
| 1,932,143 | Piercy | Oct. 24, 1933 |
| 2,048,105 | Cobbs | July 21, 1936 |
| 2,185,898 | Mitchell | Jan. 2, 1940 |
| 2,212,007 | Buchanan | Aug. 20, 1940 |
| 2,389,298 | Ellis | Nov. 20, 1945 |